United States Patent [19]

Trezeguet et al.

[11] 4,341,440
[45] Jul. 27, 1982

[54] UNDERSEA OPTICAL FIBER TELECOMMUNICATIONS CABLE

[75] Inventors: Jean-Pierre Trezeguet; Jean-Patrick Vives, both of Calais; Georges Comte, Lyons, all of France

[73] Assignee: Societe Anonyme dite: Les Cables de Lyon, Lyons, France

[21] Appl. No.: 102,465

[22] Filed: Dec. 11, 1979

[30] Foreign Application Priority Data

Dec. 12, 1978 [FR] France .................. 78 34890

[51] Int. Cl.³ .................................................. G02B 5/14
[52] U.S. Cl. ................................ 350/96.23; 174/109
[58] Field of Search ............. 350/96.23; 174/102 SP, 174/105 B, 109

[56] References Cited

U.S. PATENT DOCUMENTS

| 2,006,932 | 7/1935 | Rosch ................... | 174/109 X |
| 3,790,697 | 2/1974 | Buckingham ............ | 174/109 X |
| 3,955,878 | 5/1976 | Novak ................... | 350/96.23 |
| 4,072,398 | 2/1978 | Larsen et al. .......... | 350/96.23 |

FOREIGN PATENT DOCUMENTS

| 561633 | 9/1932 | Fed. Rep. of Germany . | |
| 566098 | 12/1932 | Fed. Rep. of Germany . | |
| 608578 | 1/1935 | Fed. Rep. of Germany . | |
| 2507649 | 9/1976 | Fed. Rep. of Germany ... | 350/96.23 |
| 2390816 | 12/1978 | France . | |
| 566086 | 8/1957 | Italy ...................... | 174/109 |
| 428540 | 5/1935 | United Kingdom ........ | 174/109 |
| 1453402 | 10/1976 | United Kingdom . | |
| 1481582 | 8/1977 | United Kingdom ........ | 350/96.23 |
| 2010528 | 6/1979 | United Kingdom ........ | 350/96.23 |

OTHER PUBLICATIONS

Wilkins, "Fiber Optic Cables For Undersea Communications," in *Fiber and Integrated Optics*, Vol. 1, No. 1, Jan. 1977, pp. 39–61.

*Primary Examiner*—John D. Lee
*Attorney, Agent, or Firm*—Sughrue, Mion, Zinn, Macpeak & Seas

[57] ABSTRACT

An undersea optical fiber cable with a protective metal casing around the optical fibers 1. The casing includes a stranded assembly 3 of high-tensile metal wires of polygonal cross-section 3A forming an arch structure. The side (4) which is turned towards the axis of the cable is shorter than the outwardly-turned side 5, and intermediate sides 6 touch or interlock. A metal outer tube 7 is formed by skelping a tape to produce a cylinder and then welding the longitudinal edges thereof. The metal casing is filled with a liquid 4A whose density is close to that of water and whose viscosity is close to that of glycerine. The overall density of the cable is slightly higher than that of water.

6 Claims, 3 Drawing Figures

UNDERSEA OPTICAL FIBER TELECOMMUNICATIONS CABLE

FIELD OF THE INVENTION

The present invention relates to an undersea optical fibre telecommunications cable. It also relates to a method and apparatus for manufacturing such a cable.

BACKGROUND OF THE INVENTION

Optical fibres made of silica or silica doped with germanium, boron or phosphorus in particular provide a very attractive means of long-distance transmission of telephone and television data because they have low attenuation for short-wave infrared radiation (800 to 1300 nanometers). Therefore, it would have been desirable to use them for undersea links if, up till now, no obstacles and cropped up. In particular, fibres are very sensitive to the combined effects of moisture and pressure which prevail at great depths, and to mechanical stresses which further weaken them by microcurves or even the pure and simple breakage of the fibres under a relatively low tractive force. Further, for long distances, it is necessary to place repeaters at intervals along the line. This requires the use of remote-supply electric conductors because the fibres are not electrically conductive.

It has effectively been proposed in the past to protect optical fibres in a metal casing, but protection thus conferred is not sufficient in itself to warrant the use of optical fibres for undersea transmission.

Preferred embodiments of the invention remedy these disadvantages and provide an optical fibre undersea cable which can be sunk to great depths, has low attentuation per unit length, is sufficiently strong to withstand various laying or raising handling operations and to which metal conductors can be added.

SUMMARY OF THE INVENTION

The present invention provides in a first aspect an undersea optical fibre telecommunications cable, wherein the optical fibre or fibres are immersed in a liquid whose viscosity is close to that of glycerine.

The optical fibre containing liquid is housed in a casing formed by a stranded assembly of metal wires of generally polygonal cross-section, the axially directed sides of the polygonal sections being shorter than the outwardly directed sides and the intermediate sides being in contact with those of neighbouring wires to form an arch structure.

Further, the casing is covered with an outer metal tube formed by skelping a metal tape around the casing and welding the meeting edges of the tape.

The density of the optical fibre containing liquid is close to that of water so that the overall density of the cable is slightly higher than that of water.

It also preferably includes at least one of the following features.

The metal wires have a substantially trapezoidal cross-section with the small bases turned towards the axis of the cable and large bases turned towards the outside of the cable.

The metal wires have interlocking V-shaped intermediate sides.

The optical fibre containing liquid is a paraffin oil, a silicone oil or a diarylalkane; and it includes a plastics or metal axial core round which optical fibres are wound at a large pitch helix.

In a second aspect of the present invention provides a method of manufacturing an undersea optical fibre telecommunications cable wherein the optical fibres pass through a bath of a liquid whose density viscosity is close to that of glycerine and whose is close to that of water such that the overall density of the cable is slightly higher than that of water. Metal wires of high tensile strength and substantially polygonal cross-section are stranded round said fibres, said metal wires each having a side which is to be turned towards the axis of the cable, said side being shorter than that which is to be turned outwards and having identical facing intermediate surfaces, such that their intermediate surfaces press against one another to form a cylindrical inner casing. The liquid is inserted between said wires just before the wires are assembled to form said cylindrical inner casing. A metal tape is skelped around said cylindrical inner casing to form a metal outer tube whose longitudinal edges are then welded; and said metal outer tube is drawn down onto said cylindrical inner casing.

A third aspect the present invention provides apparatus for manufacturing an undersea optical fibre telecommunications cable. The apparatus includes means for supplying optical fibre; a bath of liquid whose density is close to that of water, such that the overall density of the cable is slightly higher than that of water and whose viscosity is close to that of glycerine. Means are provided for passing optical fibre through the bath. A rotating cage is used for stranding metal wires to form a cylindrical inner casing. A spray is employed for spraying liquid on the metal wires just before they are assembled to form said cylindrical inner casing. The apparatus further comprises means for supplying metal tape, means for skelping said tape to form a metal outer tube; means for longitudinally welding the longitudinal edges of said metal outer tube; and means for drawing said metal outer tube down onto said cylindrical inner casing.

Two optical fibre telecommunications cables in accordance with the invention and having a plastics core, together with a method of manufacture are described hereinafter by way of example and with reference to the figures of the accompanying drawings.

DESCRIPTION OF PREFERRED EMBODIMENTS

Figure 1:
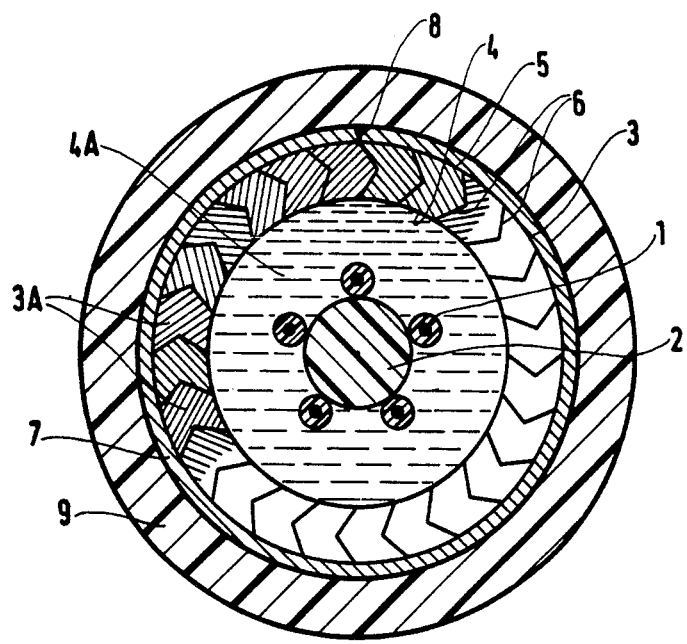
FIG. 1 illustrates the cross-section of a first variant of a cable.

In FIG. 1, optical fibres 1, covered with a covering made of a plastics material such as a fluorinated polymer, a polyamid, a silicone elastomer, are helically laid with a long pitch around an axial core 2 made of a plastics material, e.g. polyamid or polyethylene, the pitch of the helixes being such that the length of the optical fibres is slightly longer (by a few percent) than the axial length, with a view to allowing them to take up the elongation due to traction forces. A casing 3 is formed from an arch of shaped steel wires 3A, having a generally polygonal cross-section. The axially directed side of the polygon is shorter than the outwardly directed side, while the intermediate sides 6 are of an interlocking V shape. The wires are cabled to constitute a rigid undeformable casing capable of withstanding externally applied pressure. The inside of the casing is filled with a liquid 4A whose density is close to that of water, whose viscosity is close to that of glycerine, and which does not chemically attack the optical fibre coverings. A paraffin oil, a silicon oil or diarylalkane, for example, each constitute a suitable liquid 4A.

The casing 3 made of high tensile steel wires is surrounded by a drawn copper tube 7 which has a longitudinal weld 8. The copper tube is itself surrounded by a polyolefin outer sheath 9 made, e.g. of polyethylene. The sheath 9 forms the outer covering of the cable which it protects against moisture and corrosion due to sea water.

Figure 2:
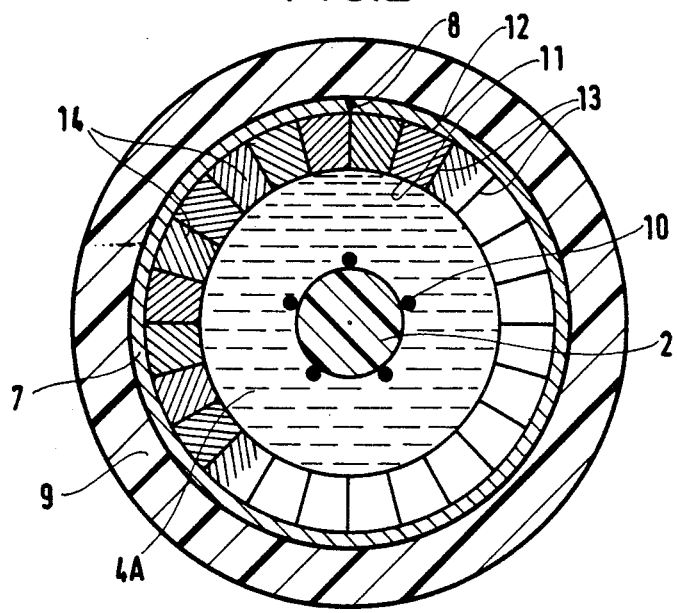
FIG. 2 illustrates the cross-section of another variant of a cable.

FIG. 2 illustrates the cross-section of a cable analogous to that in FIG. 1, but in which the optical fibres 10 are bare; further, the steel wires which form the rigid undeformable casing having trapezoidal cross-section, with their small bases 11 being turned inwards and their large bases 12 being turned outwards, the angles at the tops of the trapezia being such that their sides touch one another completely.

Figure 3:
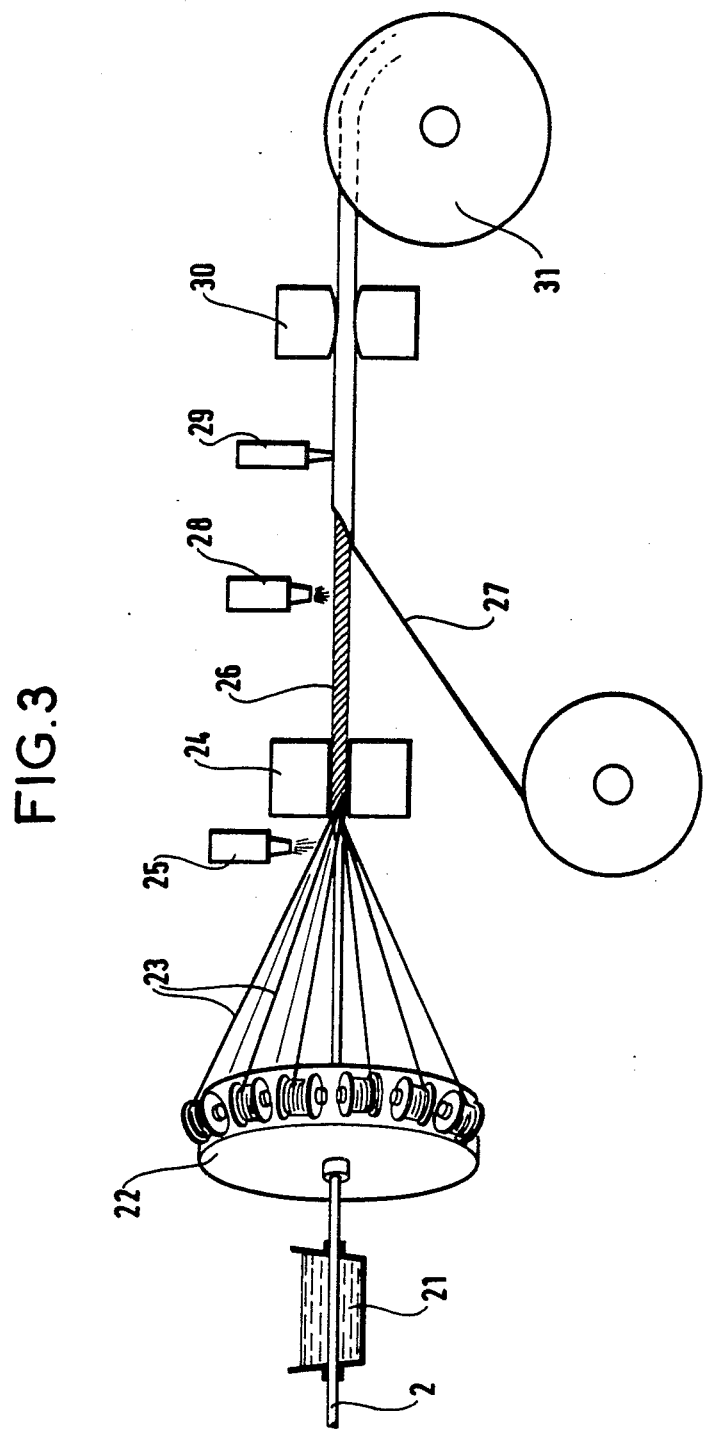
FIG. 3 is a schematic view which illustrates apparatus for manufacturing such cables.

In FIG. 3, the optical fibres to be protected are wound in a helix around the axial core 2 and are optionally covered with individual coverings of plastics material. They pass with the core through a paraffin oil bath 21.

When the fibres leave the bath, they pass through the axis of a rotating cage 22 which is intended to form, around the fibres, a circle of high-tensile steel wires 23 of trapezoidal cross-section so that they press against one another during winding due to the rotation of the cage around the fibres. The wires may optionally have V-shaped indentations on those of their sides which are intended to press against one another, to cause these sides to interlock and to prevent them from slipping against one another as they are being positioned.

When the casing of steel wires is formed around the fibres to be protected, the casing is drawn a first time through a draw plate 24 whose diameter is equal to the final outer diameter of the casing, and filler liquid is sprayed by a spray 25 just before the inlet of the draw plate, with a view to lubricating the plate and to filling the inside of the fibre cable.

After the drawing operation, the casing 26 of steel wires which houses the fibres is protected by a copper, aluminium or steel tape 27 which is substantially wider than the perimeter of the casing. The tape is progressively skelped round the sheath, urged by rollers with appropriate cross-sections or by draw plates (not shown) until its edges touch, while a thin stream of liquid sprayed by a spray 28 flows to the bottom of the groove thus formed. The touching edges of the tape are then welded with an arc lamp 29 in a controlled atmosphere, or by means of a high-frequency device, than the tube thus formed is drawn down onto the casing 26 of steel wires by means of a second draw plate 30 so that it fits tightly round the casing, while the filler liquid spreads evenly inside due to the pressure exerted.

Then, before the metal tube is stored on a drum 31 or in a tank, a plasticizing machine (not shown) coats it with a polyolefin or polyvinyl chloride protective covering which keeps out moisture.

Although undersea cables and the method of installing and manufacturing them described hereinabove with reference to the figures appear to be preferable for embodying the invention, it will be understood that various modifications can be made thereto without going beyond the scope of the invention, it being possible to replace some components of the cables, some operations of the method and some devices of the equipment by others which would perform analogous technical functions. In particular, the cable can also include electrical conductors. The optical fibres could be immersed in the liquid otherwise than by pressing through a bath, e.g. by a spray rack for spraying the liquid.

We claim:

1. An undersea optical fibre telecommunications cable, comprising:
   at least one optical fibre immersed in a liquid whose viscosity is close to that of glycerine;
   said optical fibre containing liquid being housed in a casing formed by a stranded assembly of metal wires of generally polygonal cross-section having radially inwardly directed sides of polygonal sections shorter than the radially outwardly directed sides and the intermediate sides being in contact with those of neighbouring wires to form a rigid arch structure;
   said casing being covered with an outer tube of an electrically conductive metal in the form of a skelped metal tape around the casing with welded meeting edges;
   said outer tube being surrounded by an outer sheath of polymeric material; and
   the density of the optical fibre containing liquid being close to that of water so that the overall density of the cable is slightly higher than that of water.

2. A cable according to claim 1, wherein the metal wires have a substantially trapezoidal cross-section with small bases facing towards the axis of the cable and large bases facing towards the outside of the cable.

3. A cable according to claim 1, wherein the metal wires have interlocking V-shaped intermediate sides.

4. A cable according to claim 1, wherein said liquid is chosen from the group consisting of a paraffin oil, a silicone oil and a diarylalkane.

5. A cable according to claim 1, including a plastic or metal axial core bearing optical fibres wound at a large pitch helix thereabout.

6. A cable according to claim 1, wherein the polymeric material is chosen from the group consisting of polyolefins and polyvinyl chloride.

* * * * *